(12) United States Patent
Dickinson, III et al.

(10) Patent No.: US 8,277,145 B2
(45) Date of Patent: Oct. 2, 2012

(54) ENGINEERED, SCALABLE UNDERGROUND STORAGE SYSTEM AND METHOD

(75) Inventors: Ben Wade Oakes Dickinson, III, San Francisco, CA (US); Robert Wayne Dickinson, San Rafael, CA (US); Oliver Douglas Ousterhout, Belvedere, CA (US); Lawrence Joseph Musetti, San Rafael, CA (US); Porter James Underwood, Tehachapi, CA (US); Ali Daneshy, Houston, TX (US)

(73) Assignee: SEQEnergy, LLC, San Rafael, CA (US)

( * ) Notice: Subject to any disclaimer, the term of this patent is extended or adjusted under 35 U.S.C. 154(b) by 448 days.

(21) Appl. No.: 12/582,351

(22) Filed: Oct. 20, 2009

(65) Prior Publication Data
US 2010/0101789 A1 Apr. 29, 2010

Related U.S. Application Data

(60) Provisional application No. 61/106,918, filed on Oct. 20, 2008.

(51) Int. Cl.
*B65G 5/00* (2006.01)
*E02D 3/12* (2006.01)

(52) U.S. Cl. .................. 405/57; 405/129.45; 405/129.6; 405/270

(58) Field of Classification Search .................. 405/52, 405/53, 55, 57, 58, 270, 129.35, 129.45, 405/129.55, 129.6; 175/61, 62
See application file for complete search history.

(56) References Cited

U.S. PATENT DOCUMENTS

| | | | |
|---|---|---|---|
| 3,152,640 A | 10/1964 | Marx | |
| 3,175,614 A | 3/1965 | Wyllie | |
| 3,318,380 A | 5/1967 | Tenny | |
| 5,513,713 A | 5/1996 | Groves | |
| 6,142,246 A | 11/2000 | Dickinson, III et al. | |
| 6,206,112 B1 | 3/2001 | Dickinson, III et al. | |
| 2003/0173082 A1 | 9/2003 | Vinegar et al. | |
| 2003/0183390 A1 | 10/2003 | Veenstra et al. | |
| 2007/0246994 A1 | 10/2007 | Kaminsky et al. | |
| 2009/0220303 A1 | 9/2009 | Dickinson, III et al. | |

FOREIGN PATENT DOCUMENTS

| | | |
|---|---|---|
| EP | 1770073 A1 | 4/2007 |
| WO | 03/035801 A2 | 5/2003 |
| WO | 03/095795 A1 | 11/2003 |
| WO | 2005/012688 A1 | 2/2005 |
| WO | 2007/126676 A2 | 11/2007 |
| WO | 2008/027506 A2 | 3/2008 |

*Primary Examiner* — Tara Mayo-Pinnock
(74) *Attorney, Agent, or Firm* — Edward S. Wright (57) ABSTRACT

An engineered, scalable underground containment system and method for storing compressed gases or liquids in permeable rock formations using conventional drilling techniques. The porosity and permeability of the formation may be enhanced to maximize reservoir capacity and increase the rate at which gases and liquids can be introduced into and removed from the reservoir. In some embodiments, layers of cap rock in the formation are utilized as containment barriers, and in some, containment barriers are constructed around the storage zones.

8 Claims, 11 Drawing Sheets

ENGINEERED, SCALABLE UNDERGROUND STORAGE SYSTEM AND METHOD

RELATED APPLICATION

Application No. 61/106,918, filed Oct. 20, 2008, the priority of which is claimed.

BACKGROUND OF THE INVENTION

1. Field of Invention

This invention relates generally to underground storage of gases and liquids and, more particularly, to an engineered, scalable system and method for containment of gases and liquids both in virgin rock formations and in formations that have previously been drilled and/or used for storage.

2. Related Art

This invention relates generally to underground storage of gases and liquids and, more particularly, to an engineered, scalable system and method for containment of gases and liquids both in suitable rock formations and in formations that have previously been drilled and/or used for storage.

Heretofore, the underground reservoirs typically used for such storage have included old salt or limestone mines, solution mined salt domes, depleted gas or oil fields, saline aquifers, and other underground sites having geological features that make them suitable for gas storage. A major disadvantage is that reservoirs of this nature can only be used where they are found. They cannot be positioned where storage is needed, and they cannot be scaled to meet the performance needs and other requirements of a particular application.

The natural gas industry has stored natural gas in reservoirs for many years. A network of storage facilities supports the U.S. natural gas distribution network. These reservoirs are generally of three types: depleted oil or gas fields, solution mined or pre-existing mined out salt domes and saline aquifers. According to the Federal Energy Regulatory Commission (FERC), 86% of underground storage capacity today is in depleted reservoirs. Depleted reservoirs are a powerful analog for the invention described herein. The gas storage industry has recently focused on developing storage in salt caverns. While still less that 5% of total gas storage in the U.S., salt caverns have the distinct advantage of enabling relatively rapid injection and withdrawal of gas to meet increasing needs of distributers and commercial users for mechanisms to manage their supply chain in the context of very high price volatility. Major disadvantages of the present natural gas storage models include: 1) depleted reservoirs generally are not designed to enable rapid injection and withdrawal of gas, 2) there is a limited number of salt domes or saline aquifers and these are not located heterogeneously throughout the country, 3) access to these sources is limited to their license holders, and 4) leakage has been a problem in the natural gas storage industry.

Compressed air energy storage (CAES) is a proven and effective way to store electrical energy generated during periods of relatively light demand and/or by alternative energy sources such as solar, wind, and nuclear sources for use during periods of greater demand. In such systems, compressors convert electric power to compressed air which is stored in a reservoir, and then when the power is needed, the compressed air is recovered from the reservoir converted back to electrical energy by compressed air turbine driven electrical generators. While CAES has been a proven technology and applied for over twenty years, to date, for a variety of reasons, CAES has been somewhat limited in its application. Many researchers project a dramatic increase in CAES due to the growth of alternative energy production, wind and solar energy, as the U.S. attempts to wean itself from fossil fuel sources of electrical energy. If CAES is to meet the needs of the alternative energy industry, a major limiting factor is likely to be the difficulty in locating acceptable reservoirs.

There has been significant investment in injecting CO2 in active oil fields to produce additional oil—this is known as Enhanced Oil Recovery or EOR. CO2 is produced currently from naturally occurring reservoirs and shipped by pipeline to the oil field. Major companies are in the business of extracting and shipping this CO2 for sale to the oil producers. The U.S. Department of Energy is investing significant amounts of money in assessing the efficacy of sequestering CO2 in active or depleted oil and gas fields, but the extent to which CO2 can be sequestered in such fields is probably limited by the fact that oil and gas fields often leak even when they are plugged and abandoned. Effective sequestration requires that CO2 be permanently stored in secure reservoirs that can be monitored and audited. The U.S. Department of Energy is investing significantly in a program to determine the best methods for permanent storage of CO2 in geologic reservoirs. However, the D.O.E. program concentrates on locating reservoirs with natural pre-conditions that are acceptable for this purpose. Four significant disadvantages exist in the present CO2 sequestration models being investigated: 1) EOR does not secure CO2 storage reliably, 2) natural reservoirs are difficult to discover, qualify and to get clear ownership of, 3) most natural reservoirs and oil and gas fields leak, 4) saline water in natural reservoirs can interact with the substance being stored, and 5) natural reservoirs and oil and gas fields can be a very long distance from the sources of the captured CO2.

OBJECTS AND SUMMARY OF THE INVENTION

It is in general an object of the invention to provide a new and improved system and method for underground storage and, in some cases, reproduction for later use of compressed gases and liquids.

Another object of the invention is to provide a system and method of the above character which overcome the limitations and disadvantages of systems and methods heretofore employed.

Another object of the invention is to provide multiple independent reservoirs suitably isolatable for redundancy and enhanced reliability of the CAES system.

These and other objects are achieved in accordance with the invention by providing an engineered, scalable underground containment system and method for storing compressed gases or liquids in permeable rock formations using conventional drilling techniques. The porosity and permeability of the formation may be enhanced to maximize reservoir capacity and increase the rate at which gases and liquids can be introduced into and removed from the reservoir. In some embodiments, layers of cap rock in the formation are utilized as containment barriers, and in some containment barriers are constructed around the storage zones.

DETAILED DESCRIPTION

The invention makes it possible to construct gas or liquids storage reservoirs in many geological settings without conventional requirements for pre-existing void spaces or aquifers or for excavation to create the reservoir space. The reservoir is constructed in rock utilizing natural and enhanced pore space for the storage of gases or liquids. Existing geological fractures and reservoir performance and safety are managed by the injection of barrier material at the perimeter of the reservoir. Surface systems are utilized to manage injection and recovery of the stored gases and liquids, to monitor conditions in and around the reservoir, and to verify or audit the amount of gas or liquid in the reservoir. The result is a coherent reservoir system with a cost consistent with industry requirements, that can be engineered to scale and performance specifications, and be optimally located where such a reservoir is required.

Before construction of an underground reservoir begins, one or more test wells are drilled into the proposed site, and the formations are tested to identify those which are suitable for storing gas or liquid in accordance with the invention.

If the site is suitable, one or more vertical wells and/or horizontal or lateral wells are drilled into the formation. The drilling can be done with conventional or specialized horizontal or vertical drilling equipment, utilizing a pressurized drilling fluid and hydraulic or rotary bit technologies. With hydraulic drilling, as disclosed, for example, in U.S. Pat. No. 5,513,713, the boreholes are drilled with an elongated tubular drill string which is connected to a source of pressurized drilling fluid at the surface and has a drill head with nozzles that deliver high pressure fluid to create high velocity cutting jets at its distal end. The drill string is propelled through the formation by the pressurized fluid via telescoping tubes in which the inner tube is propelled or ejected by the high pressure fluid, with the cutting jets blasting or eroding or exfoliating away the rock and other material in front of the drill head. With conventional rotary drilling, a rotating bit cuts through the formation.

Casing may be installed in the wells and cemented in place by pumping cement down the centers and up into the annular space between the formation and the outer sides of the casings. The wells can be of any desired size and depth. If a deeper reservoir and/or horizontal or vertical containment is desired, one or more additional wells can be drilled from the lower ends of the cased wells. The additional wells are usually non-vertical, or deviated, and can either be cased or uncased, as dictated by the particular application.

If necessary, the porosity and permeability of the formation can be increased by suitable known techniques such as fracturing the formation, drilling laterals into the formation, infusing proppants into fractures or cracks in the formation, and combinations thereof. Such techniques are commonly used in the drilling of oil, gas, and water wells to enhance the flow of oil, gas, or water from the formation.

If required, perforation can be done with radially directed strings of shaped charges which are inserted into the wells to the depths where the reservoir is to be located. After being positioned in the wells, the charges are fired to perforate the well casings and create horizontal void spaces or tunnels in the formation. The charges are spaced apart by a suitable distance such as 18, 36 or 42 inches, depending upon the spacing desired between the perforation tunnels, and the length of the void spaces or tunnels thus created is typically on the order of 36 inches, or less.

Perforating with explosives can decrease the permeability of the formation by crushing the material near the walls of the perforation tunnels and by introducing and filling pores with debris that can further hinder flow or create an impermeable layer of crushed rock in the formation. This decrease in permeability can be offset by acidizing, i.e. injecting an acid or other rock and metal dissolving chemicals into the formation through the perforation tunnels to dissolve the debris and a portion of the rock and thereby create a larger pore or wormhole structure in the formation.

Access to the formation can also be secured with a perforated or slotted pipe which is placed inside an uncased hole in the formation where the reservoir is to be formed.

The deliverability of the formation can be further increased or enhanced by hydraulic fracturing. In this process, a fracturing fluid is pumped into the perforated or uncased well at a rate sufficient to increase the pressure in the formation to a level sufficient to overcome the in situ stresses and tensile strength of the formation rock or strata. The pressure is typically, as an example, on the order of 2,000 to 15,000 psi in order to exceed the fracture gradient of the formation and cause the formation to crack, with the fracturing fluid entering the fracture and extending it into the formation. In order to keep the fracture open after the pumping has stopped, solid proppant particles can be added to the fracturing fluid and the resulting slurry injected into the formation. The proppant is carried into the fractures by the fracturing fluid. The role of proppant is to keep the fracture open after the pressurized fluid is returned to the surface.

Any suitable fracturing fluid can be used, including water, gels, foams, or gases such as nitrogen, carbon dioxide, acids or air, and combinations thereof. The proppant can, for example, be gravel, sand, or ceramic particles, depending upon the magnitude of in situ stresses, particle strength, and rock constituency.

Hydraulic fractures tend to follow or be directed by the tectonic forces in the formation and generally propagate in a direction perpendicular to the direction of least in-situ principal tectonic stress. If the least in-situ principal stress is vertical, the fracture often will radiate outwardly from its source as a horizontal or a pancake fracture with a radius on the order of tens to hundreds of feet and a width on the order of tenths of an inch. If the least in-situ principal stress is horizontal then the fracture often will grow vertically with a height and a length on the order of tens to hundreds of feet and a width on the order of tenths of an inch.

In general, the least principal stress is vertical near the surface, e.g. to a depth of about 1,000 feet, and horizontal below that, and an array of shallow horizontal wells can create a roof effect or cap rock.

Lateral bores for enhancing the porosity and permeability of the formation can be drilled hydraulically as disclosed, for example, in U.S. Pat. Nos. 6,142,246 and 6,206,112. In such processes, a drilling module having a plurality of extendable drilling tubes is inserted into a well at the end of a drill string. The drilling tubes are propelled in the forward direction, or extended, by a pressurized drilling fluid which is introduced through the drill string and discharged through nozzles at the ends of the tubes in the form of high velocity cutting jets. As the drilling tubes are extended, they are bent and directed laterally by rollers or other suitable means carried by the drilling module so that the cutting jets are directed into the formation at a selected angle of approximately 45 degrees to the axis of the main bore or well. When the tubing is retracted back into the housing, it is once again reformed by the rollers and returns to its initial linear shape. Alternatively, if desired, the lateral bores can be formed by conventional horizontal or deviated drilling techniques, as desired.

Whether the lateral drilling is done hydraulically or by rotary bit techniques, the drill either cuts through the side wall of the well casing or passes through windows that have been precut in the side wall, depending upon the material, e.g. fiberglass or steel, of which the casing is made. Based upon field experience, fiberglass may also have an advantage in avoiding corrosion problems in some applications.

Several embodiments of containment structures constructed in part by the use of hydraulically drilled laterals are disclosed in Ser. No. 12/396,287, filed Mar. 2, 2009, the disclosure of which is incorporated herein by reference.

The porosity and permeability of the formation outside the desired reservoir can be decreased to form barrier walls by the same techniques that are used for increasing permeability and porosity within the reservoir, with the additional step of injecting a liquid or slurry sealant into the formation outside the reservoir. The sealant material preferably is one having a long life as well as being impervious to the sequestered or stored substance. In addition, the sealant or barrier material is preferably one which is not brittle so as not to break or fail in the event of an earthquake or other shift in the formation. A particularly preferred material is one which can be injected into the formation as a low viscosity liquid and then solidifies within the formation. Suitable sealant materials include lost circulation materials and other barrier materials similar to those used in the oil and gas industry, typically flexible cements or standard oil field cements, and other materials which are thixotropic or gel-like.

Figure 1:
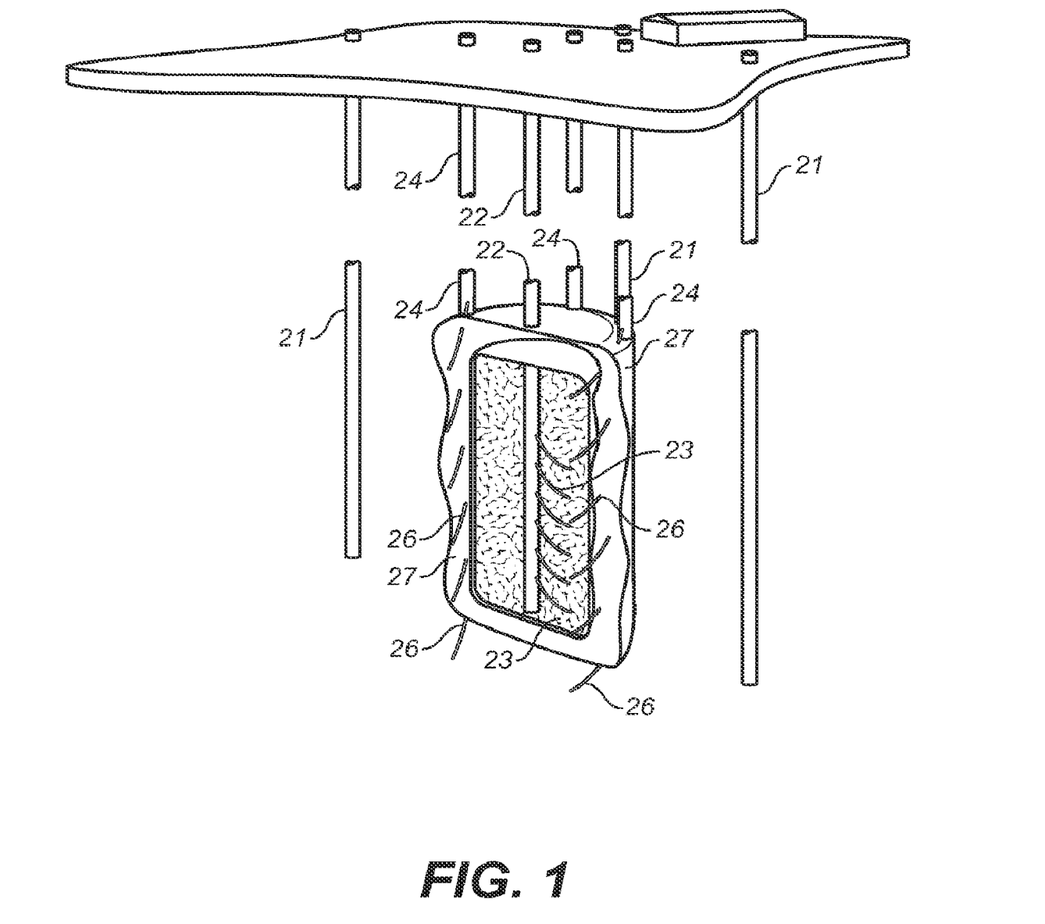
FIG. 1 is a view of one embodiment of an underground storage system according to the invention.

In the embodiment illustrated in FIG. 1, a plurality of monitoring wells 21 are drilled into the formation at the site where underground storage is desired, and geophysical tests are conducted through these wells to ensure that the site is suitable for containment.

A vertically extending well 22 is then drilled in the formation where the center of the reservoir is to be located, and lateral bores 23 are drilled from the central well to increase the deliverability of the formation. A plurality of containment wells 24 are drilled into the formation about the periphery of the reservoir, with laterals 26 extending from the containment wells in a generally peripheral direction. A sealant material is injected into the formation through the laterals to form a containment wall or barrier 27 about the reservoir.

The gas or liquid to be stored is injected into the reservoir through the central bore and the lateral bores, following which the central bore is closed off, sealed, or valved off to retain the gas or liquid in the reservoir. If the gas or liquid is to be recovered for future use, as in the case of CAES, the recovery can occur through the central and/or peripheral bores.

The monitoring wells 21 are also used for monitoring the condition of the reservoir, with leak detectors and other sensors being introduced into them and coupled to instrumentation and computers at the surface. Surface mounted tilt meters or seismic measurement/monitoring systems can be utilized to confirm the integrity of the formation containment barrier. Any repairs to the barrier wall 26 that may be necessary can be made through the containment wells 24 at the periphery of the reservoir.

Figure 2:
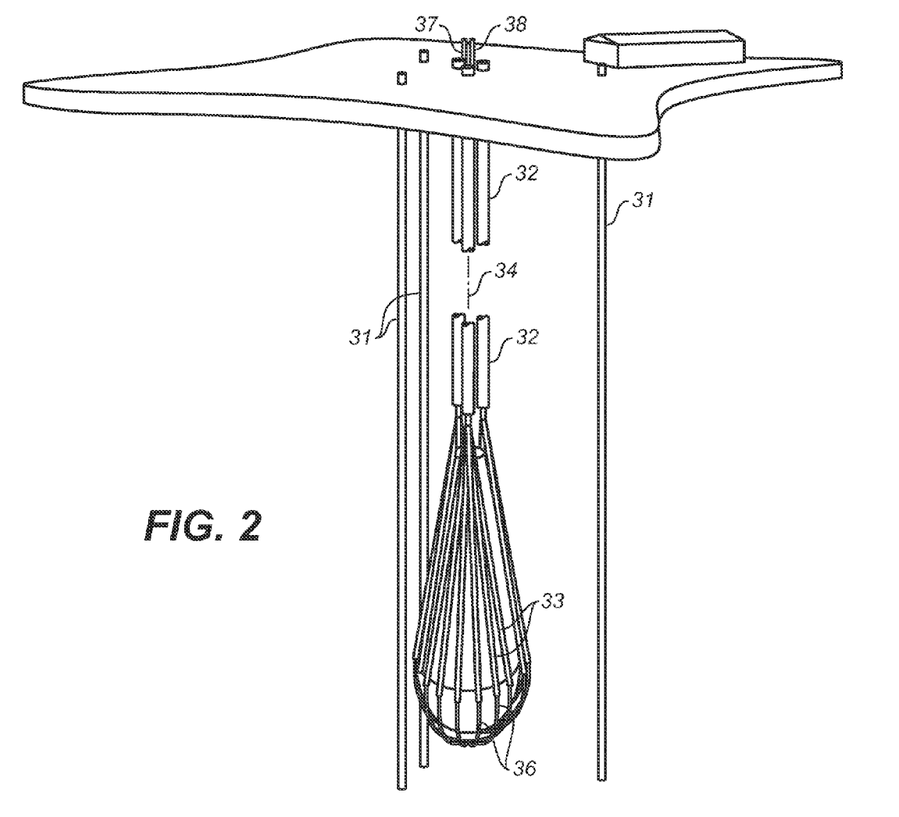
FIG. 2 is a view of another embodiment of an underground storage system according to the invention.
Figure 3:
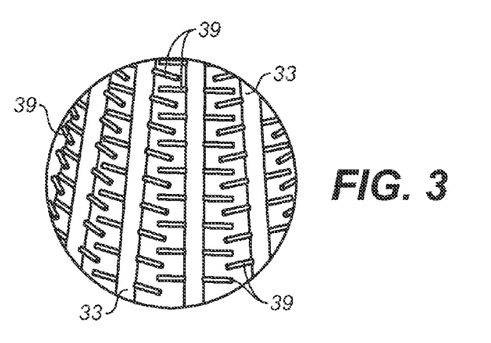
FIG. 3 is an enlarged, fragmentary view of a portion of the embodiment of FIG. 2.

FIG. 2 illustrates an embodiment of a containment system which is particularly suitable for use as a reservoir in a CAES system where the air is stored at a hydrostatic pressure on the order of 1,000 psia and at depths less than 2,000 feet. Prior to commencement of work on the containment structure, monitoring wells 31 are drilled into the proposed site, and geophysical and geological tests are conducted to ensure that the site is suitable for containment.

If the site is suitable, three vertical wells 32 are drilled into the rock formation at the site. These wells can, for example, be as large as 36 inches in diameter, with centerlines spaced 6 feet apart, and drilled to a depth of approximately 350 feet. Casings are cemented in place throughout the full lengths of the wells.

A plurality of smaller wells 33 extend deeper and obliquely into the formation from the lower end of each of the casings. In one example, six wells extend from each of the main wells to a depth of 450 feet. The smaller wells are spaced circumferentially about the central axis 34 of the main wells and are inclined downwardly and outwardly in a conical pattern at angles of approximately 8 degrees relative to the central axis. At a depth of approximately 450 feet, the centerlines of the smaller wells are approximately 6 feet apart.

Laterals 36 extend from the lower ends of the smaller wells to form a bottom closure for the containment structure. In the embodiment illustrated, the laterals curve toward the vertical centerline 34 of the containment structure and form a dome-shaped closure. The laterals can, for example, be 1¼ inches in diameter with a 30-foot radius of curvature and are drilled hydraulically through drill strings that are cemented in place to form casings or liners. Alternatively, in some applications, the bottom of the reservoir can be left open, if desired.

Compressed air passes to and from the containment structure through an inlet pipe 37 and an outlet pipe 38 which extend vertically and are cemented in place between the main well casings.

The casings in the smaller wells 33 are explosively or otherwise perforated at axially spaced intervals with sufficient charge to penetrate the formation for a distance on the order of 18 inches, or less and form a network of interlaced tunnels 39 between adjacent ones of the casings. The laterals 36 that form the bottom closure are electrochemically perforated along their lengths.

After the casings and the laterals have been perforated, the formation is hydraulically fractured both inside and outside the reservoir, and a barrier material is injected into the outer fractures to form an essentially impermeable, ductile membrane for containing the compressed air.

Since the vertical walls of the containment contact the rock around the containment, the forces are transmitted into that rock.

Upon completion, the containment structure is pressure tested with compressed air to which a tracer may be added to aid in the detection of leakage via the monitoring wells.

Thereafter, the integrity of the structure continues to be monitored via the monitoring wells or surface wells, and repairs are made as needed via the wells through which the barrier material was injected.

Figure 4:
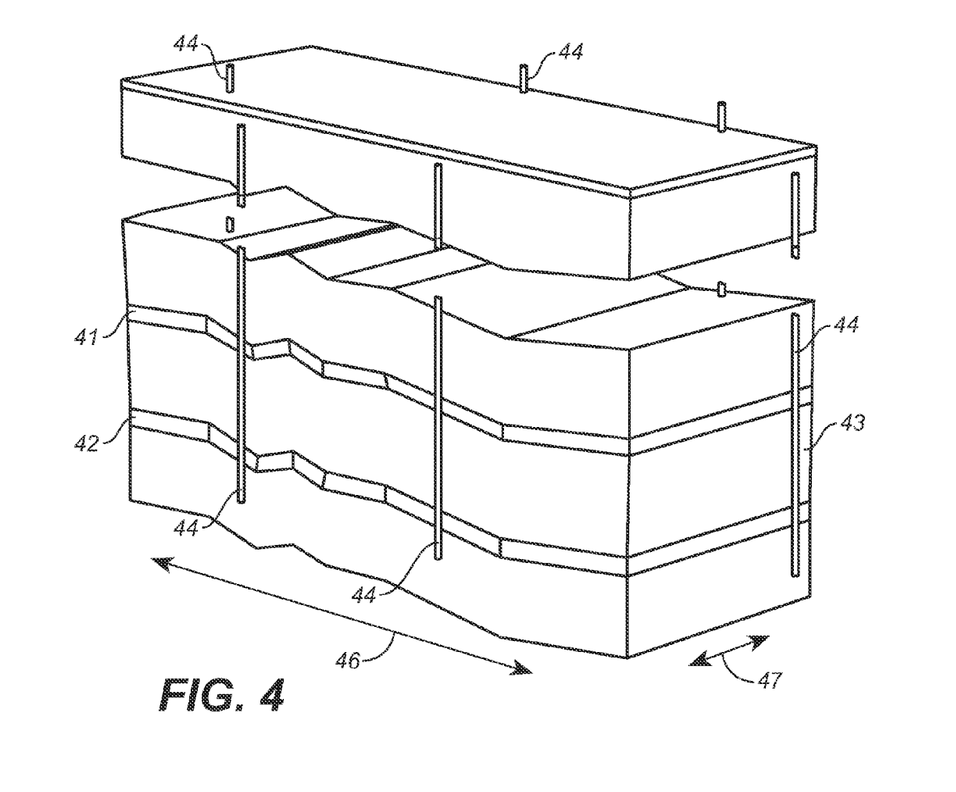
FIG. 4 is a fragmentary view of a geological formation which is particularly suited for storing gas in accordance with the invention.

In the embodiments that follow, the reservoirs are oriented horizontally, and a geological formation that is particularly suitable for such systems is depicted in FIG. 4. This formation includes impermeable natural cap rock layers 41, 42 consisting of relatively impermeable rock such as shale. Each of these layers has a thickness of at least 10-20 feet, with the upper layer being located at a depth of at least 2,000 feet below the surface. The shale layers are separated by a distance of about 50-200 feet, with a porous formation 43 of corresponding thickness between them. Alternatively, the cap rock can be created with an array of horizontally extending wells and a sealant injected into the formation through those wells.

Before construction of a storage system begins, a plurality of vertical test wells 44 are drilled into the formation around the boundary of the potential storage area for coring, logging, and determining the fracture orientation of the formation. These wells extend to a depth below the desired storage area, and the fracture orientation information obtained includes the natural fracturing plane 46 of the formation and the plane of least principal tectonic stress 47.

Figure 5:
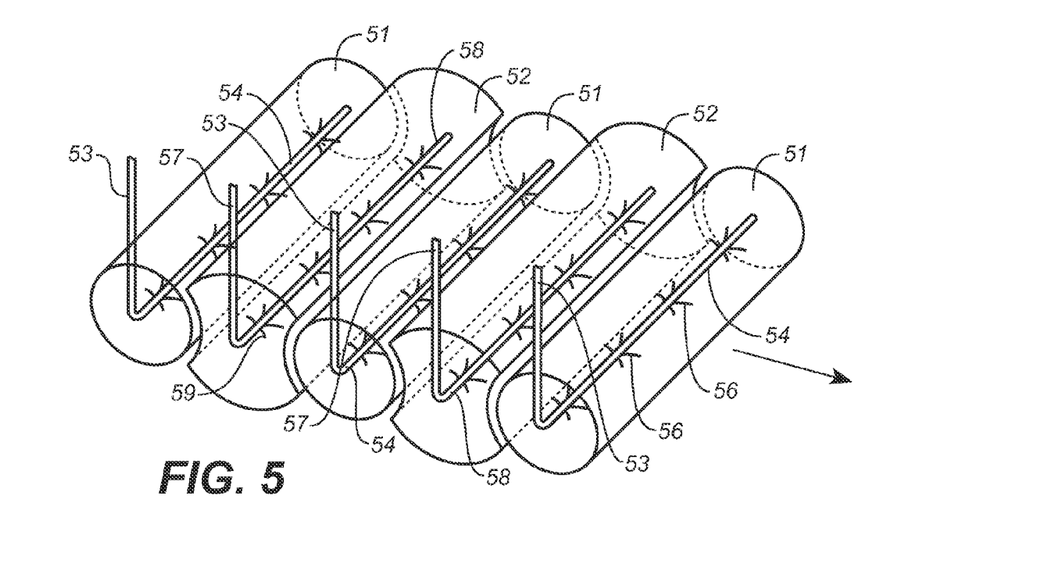
FIG. 5 is an isometric view of an embodiment of an underground storage system incorporating multiple horizontal cylinders according to the invention.

FIG. 5 illustrates one embodiment of a containment system that can be constructed in a formation such as the one shown in FIG. 4. In this embodiment, a single layer of horizontally extending storage zones 51 and isolation or barrier zones 52 are formed between the layers of cap rock or shale. The storage zones are formed by drilling vertical wells 53 to the depth where the reservoir is to be located and then drilling horizontally from the lower ends of the vertical wells to form large diameter lateral bores or wells 54 in the formation between the layers of cap rock. The lateral bores are parallel to each other, and in the embodiment illustrated, multiple laterals 56 are drilled from the lateral bores to enhance the porosity of the formation. Depending upon the natural porosity of the formation, such laterals may not be needed.

In the embodiment of FIG. 5, barrier zones are formed by drilling vertical wells 57 to the same depth as the storage zone wells and then drilling horizontally to form lateral bores or wells 58 between and on opposite sides of the storage zones, with multiple laterals 59 extending from the lateral bores. The drilling of the wells and laterals for both the storage zones and the isolation zones can be done hydraulically or by rotary bit, and the porosity of the formation in the storage zones and/or the barrier zones can be further enhanced by any suitable techniques, including those discussed above.

When the drilling is completed, a barrier material or sealant is introduced into the formation in the isolation zones through wells 57. This material diffuses into the formation and plugs small cracks and fissures therein, forming containment barriers around the storage zones. The gas or liquid to be stored is introduced into the storage zones through wells 53 which are then sealed off if the storage is to be permanent as in the case of CO2. If, however, the gas or liquid is to be recovered as, for example, in the case of CAES, then wells 53 are left open and provided with valves. Isolation zone wells 57 and laterals 58 are also utilized as monitoring wells, and conditions in and around the reservoir can be monitored by sensors in the formation or on the surface above which are connected to instrumentation at the surface through them. As needed, repairs can also be made via the wells 57 and laterals 58 through which the barrier material was injected.

In this embodiment, the impermeable layers of cap rock above and below the reservoir provide vertical containment for the gas or liquid in the storage zones, and the barrier zones provide horizontal containment. The cap rock can either be naturally occurring, or it can be formed by drilling an array of horizontally extending wells and injecting a sealant into the formation through those wells.

Figure 6:
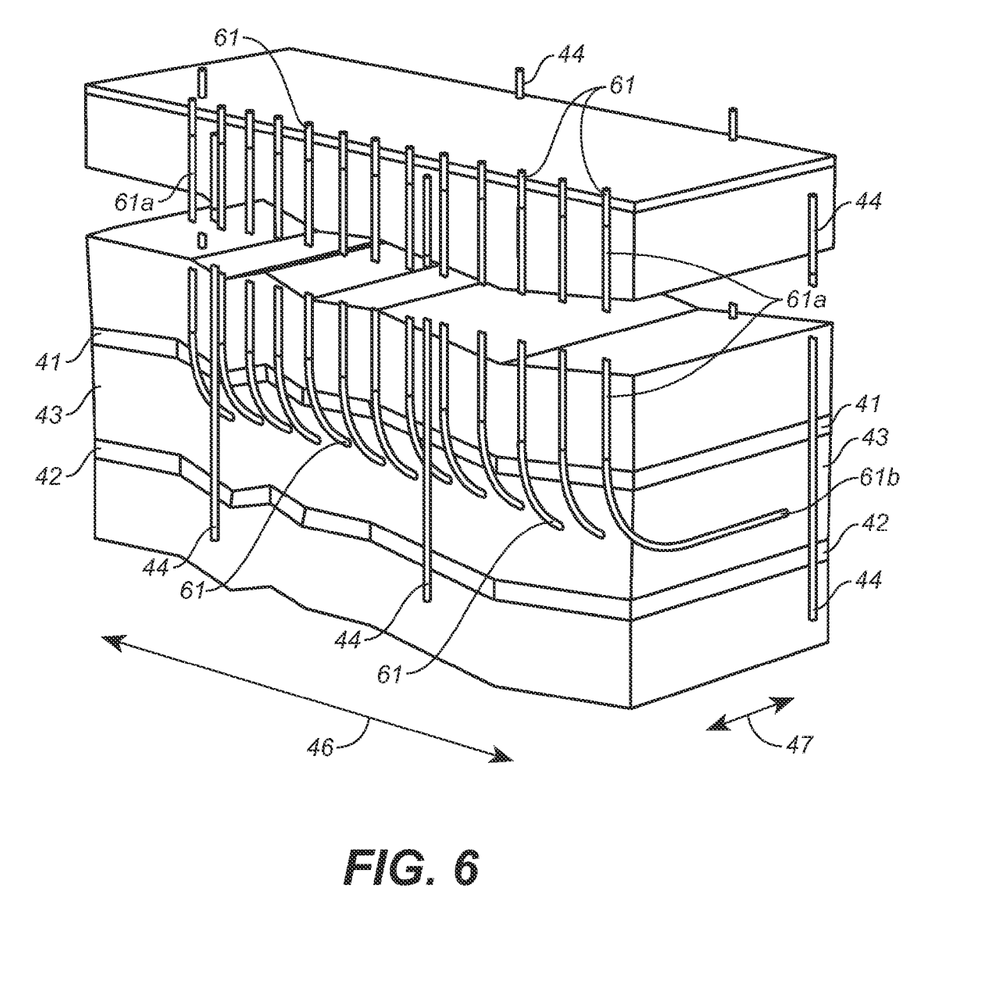
FIGS. 6-9 are fragmentary views of additional embodiments of an underground storage system incorporating different combinations of vertical and horizontal wells according to the invention.

FIG. 6 illustrates a system which has no constructed barriers. In this embodiment, a plurality of injection/production wells 61 are drilled to a depth of at least 2,000 feet and extended horizontally into the formation 43 between cap rock layers 41, 42, with a medium to long radius of curvature between the vertical sections 61*a* and the horizontal sections 61*b*. The horizontal sections extend in a direction parallel to the plane of least principal tectonic stress 47 and perpendicular to the natural fracturing plane 46 of the formation. These wells are cased to the heels of the horizontal sections, and the horizontal sections are uncased.

The system is readily scalable, and the number, spacing, and dimensions of injection/production wells 61 can be adjusted in accordance with the thickness and properties of the formation and the flow requirements of the system.

In this embodiment, test wells 44 are also utilized as monitoring wells, and there are no constructed barriers. Instead, impermeable layers of cap rock above and below the storage zone would provide vertical containment, and the storage zone is self-sealing in the horizontal directions due to capillary action. Here again, the cap rock 41, 42 can either be naturally occurring or created with horizontally extending wells and a sealant.

Figure 7:
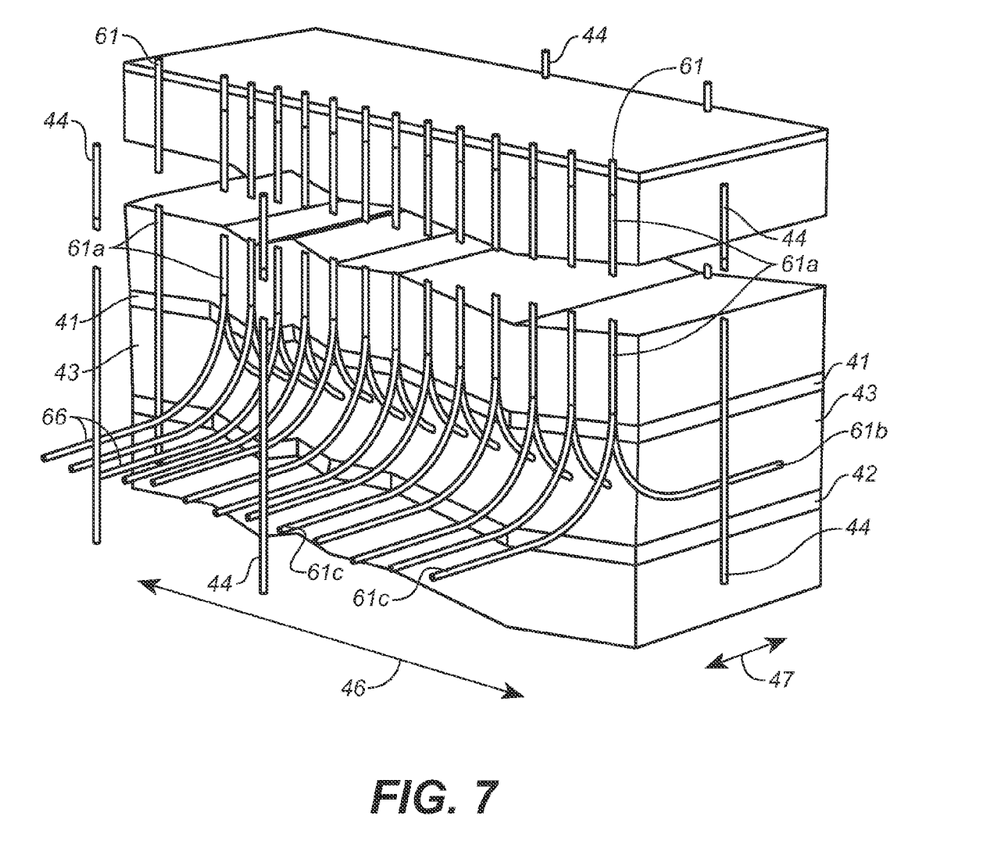

The embodiment of FIG. 7 is similar to the embodiment of FIG. 6 and, in addition, has a second set of horizontally extending well sections 61*c* at the lower ends of vertical sections 61*a*. Like sections 61*b*, they extend into the formation 43 between cap rock layers 41, 42. Sections 61*b*, 61*c* extend in opposite directions from the vertical sections, parallel to the plane of least principal tectonic stress 47 and perpendicular to the natural fracturing plane 46 of the formation. Vertical sections 61*a* are cased to the heels of horizontal sections 61*c*, and sections 61*b* and 61*c* are uncased. This embodiment likewise has no constructed barriers, and it provides two horizontally extending injection/projection wells for each vertical well, with test wells 44 once again being utilized as monitoring wells.

Figure 8:
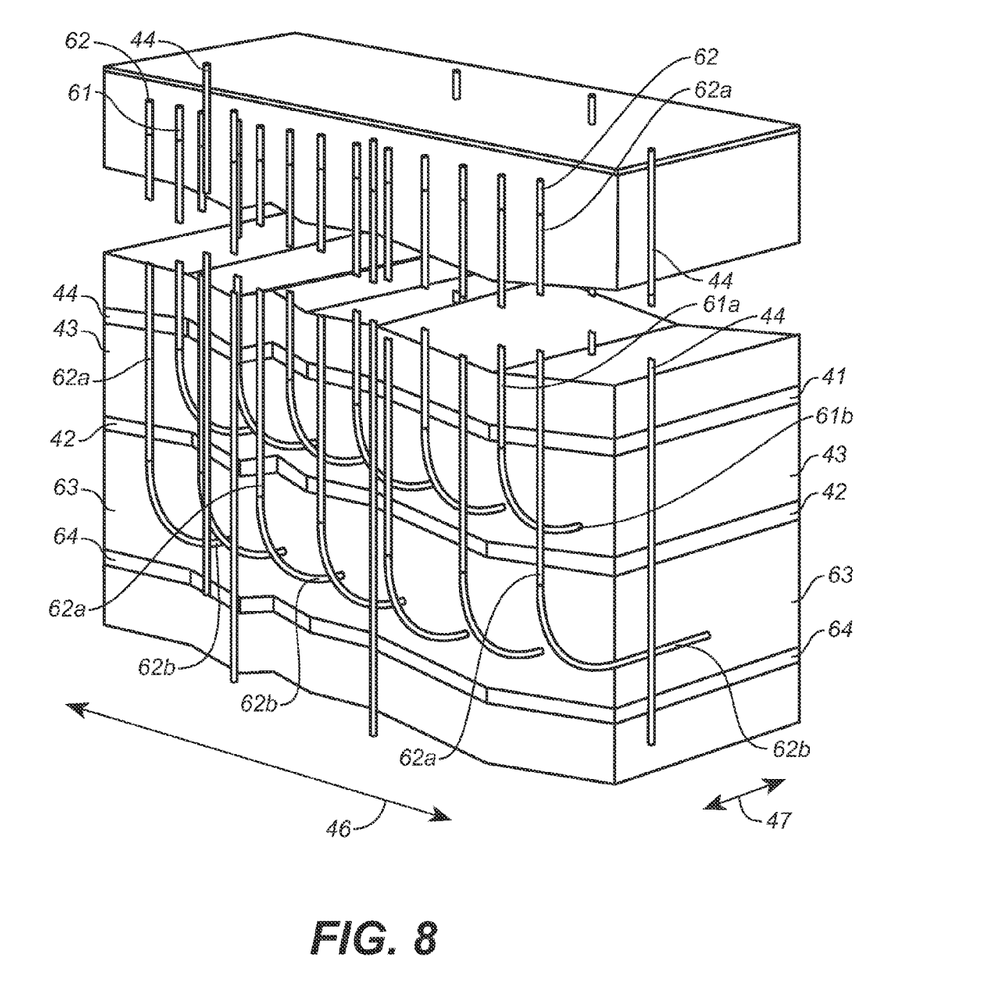

FIG. 8 illustrates another embodiment which has no constructed barriers but also has multiple storage zones in different layers of the formation. In this embodiment, the system has a first storage zone formed in the porous formation 43 between cap rock layers 41, 42, as in the embodiment of FIG. 6, and it also has a second storage zone in a layer of porous formation 63 beneath cap rock layer 42, with a third layer of impermeable cap rock 64 beneath the second porous layer. If the formation immediately below cap rock layer 42 is not suitable for storage, the second storage zone can be constructed between two other impermeable layers deeper in the formation.

Wells 61 are drilled into porous layer 43 as in the embodiment of FIG. 6, and a set of similar wells 62 is drilled into porous layer 63. Each of the wells 62 has a cased vertical section 62*a* and an uncased horizontal section 62*b*, with a medium to long radius of curvature between the two sections and the casing extending to the heel of the horizontal section. Like sections 61*b*, horizontal sections 62*b* extend in a direction parallel to the plane of least principal tectonic stress 47 and perpendicular to the natural fracturing plane 46 of the formation.

As in the embodiment of FIG. 6, vertical containment for the gas or liquid stored in porous layer 43 is provided by cap rock layers 41, 42, and similar containment for the gas stored in porous layer 64 is provided by the cap rock layers above and below it, i.e. layers 42, 64. The storage zones in layers 43 and 63 are self-sealing in the horizontal directions, and test wells 44 are utilized as monitoring wells. As in the other embodiments, the cap rock layers can be naturally occurring or created with horizontally extending wells and a sealant.

Figure 9:
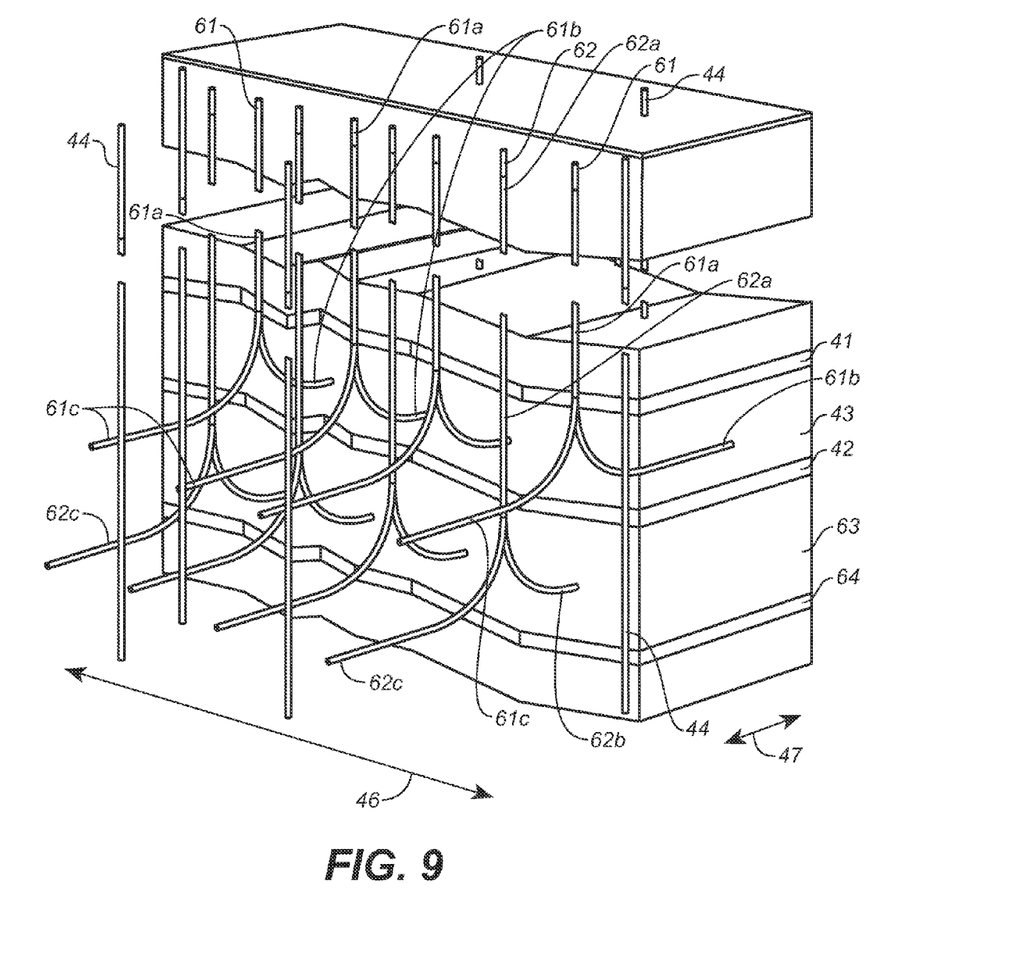

The embodiment of FIG. 9 is similar to the embodiment of FIG. 8 in that it has multiple storage zones, and it is similar to the embodiment of FIG. 7 in that it has two horizontally extending injection/production wells for each vertical well. In this embodiment, second sets of horizontally extending well sections 61c, 62c extend into formations 43, 63 from the lower ends of vertical sections 61a, 62a, with vertical sections 61a, 62a being cased to the heels of horizontal sections.

Figure 10:
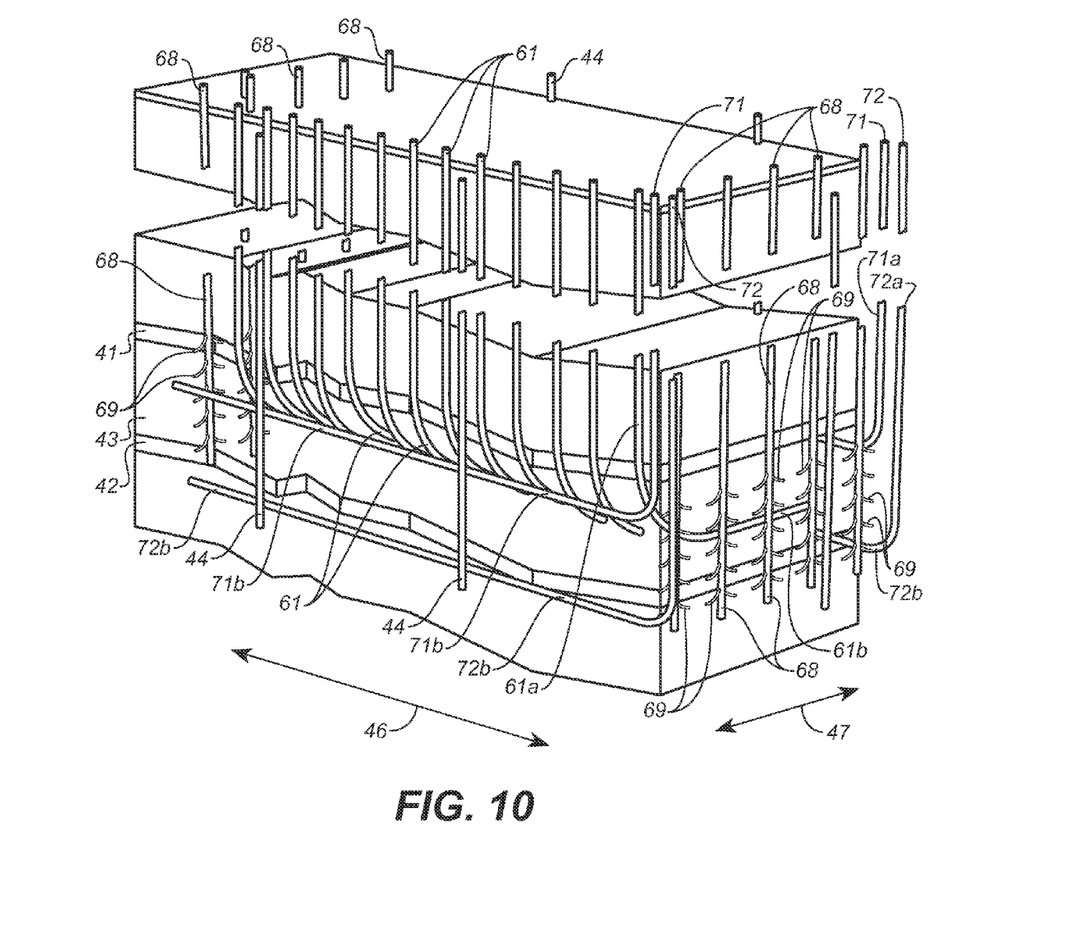
FIG. 10 is a fragmentary view illustrating the construction of another embodiment of an underground storage system incorporating different combinations of vertical and horizontal wells according to the invention.
Figure 11:
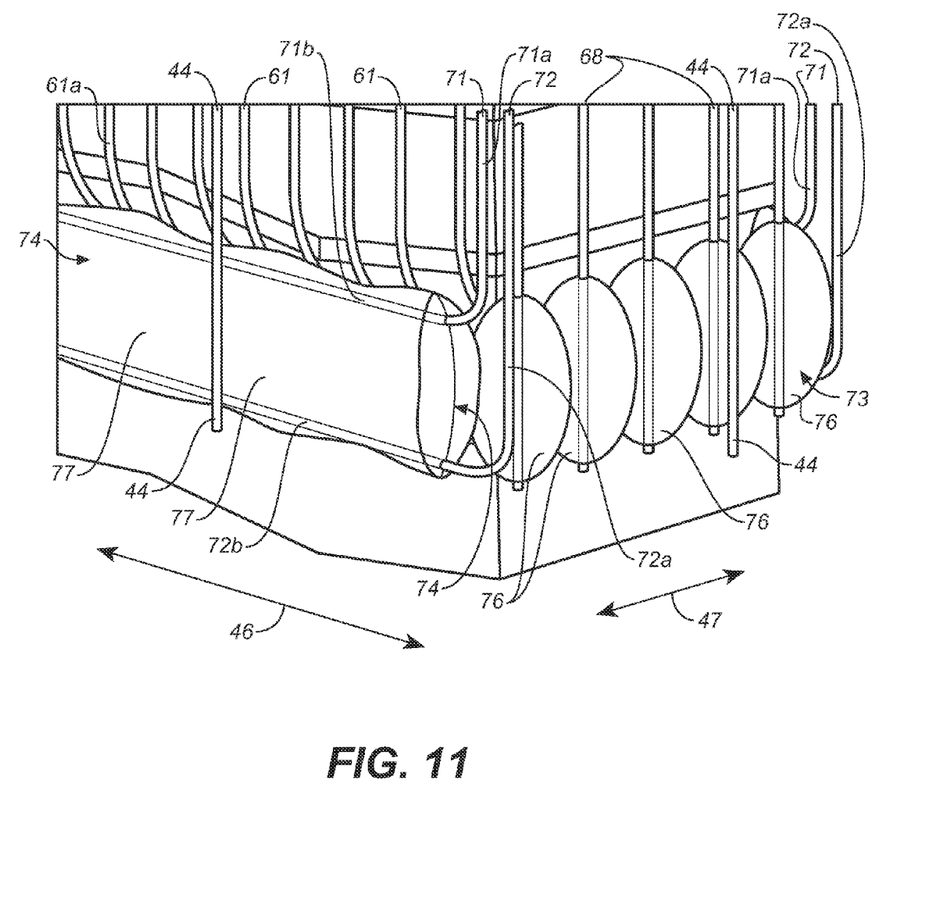
FIG. 11 is an enlarged view of a portion of a storage system constructed in accordance with the embodiment of FIG. 10.

FIGS. 10 and 11 illustrate the construction of a storage system similar to the embodiment of FIG. 6, with the addition of containment barriers around the lateral periphery of the storage zone. In this embodiment, a row of vertical barrier wells 68 is drilled to a depth below lower cap rock layer 42 at each end of the containment. These wells are cased down to the top of the storage zone and uncased beyond that, with multi laterals 69 extending from the uncased sections in a direction parallel to the ends of the storage zone.

In FIGS. 10 and 11, Barrier wells 71, 72 are also drilled along the sides of the containment. These wells have cased vertical sections 71a, 72a and uncased horizontal sections 71b, 72b, with the casing extending to the heels of the horizontal sections. Horizontal sections 71b are positioned toward the top of the storage zone, about 25% of the way down between the upper and lower barrier zones, and sections 72b are positioned toward the bottom of the storage zone, about 25% of the way up from the lower barrier zone.

A barrier material or sealant is injected into the formation beside the storage zone through the barrier wells to form barrier walls 73, 74 along the ends and sides of the zone. The material 76 is injected into wells 68 and allowed to penetrate into the porous and permeable formation. The injected material overlaps and fuses together to form continuous walls which extend across the ends of the storage zone and are impervious to the gas or liquid stored therein. Similarly, the material 77 is injected through wells 71, 72 under a pressure high enough to fracture the formation and to form a continuous wall or barrier which extends along the sides of the storage zone and connects with end walls 73 to provide a continuous horizontal containment barrier for the storage zone.

Figure 12:
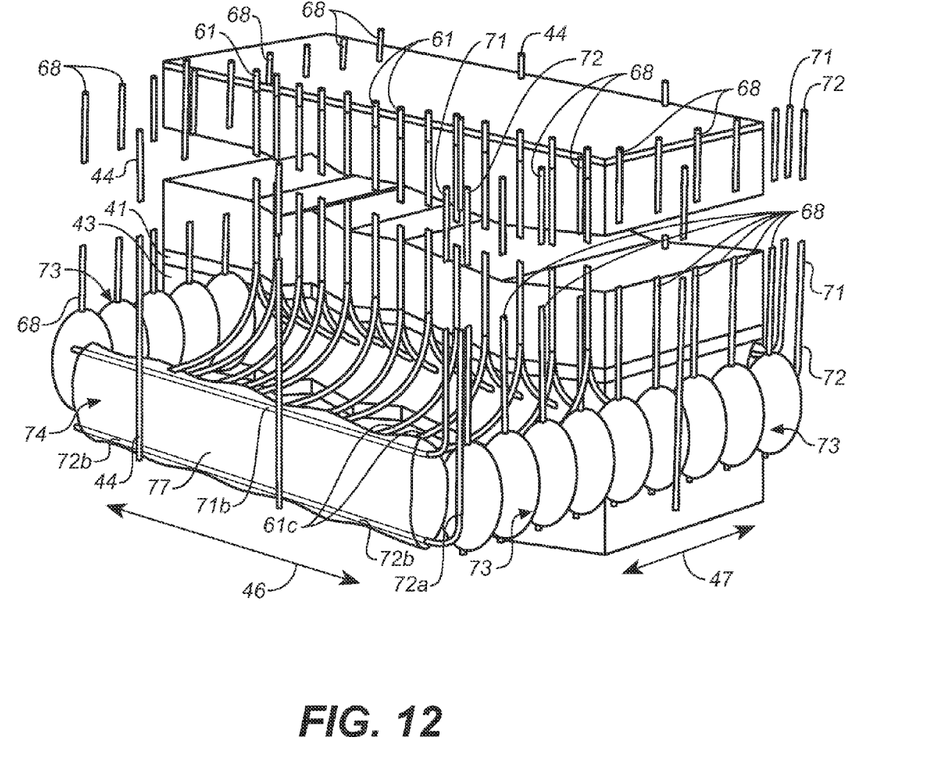
FIGS. 12 and 13 are a fragmentary view of additional embodiments of an underground storage system incorporating different combinations of horizontal and vertical wells according to the invention.
Figure 13:
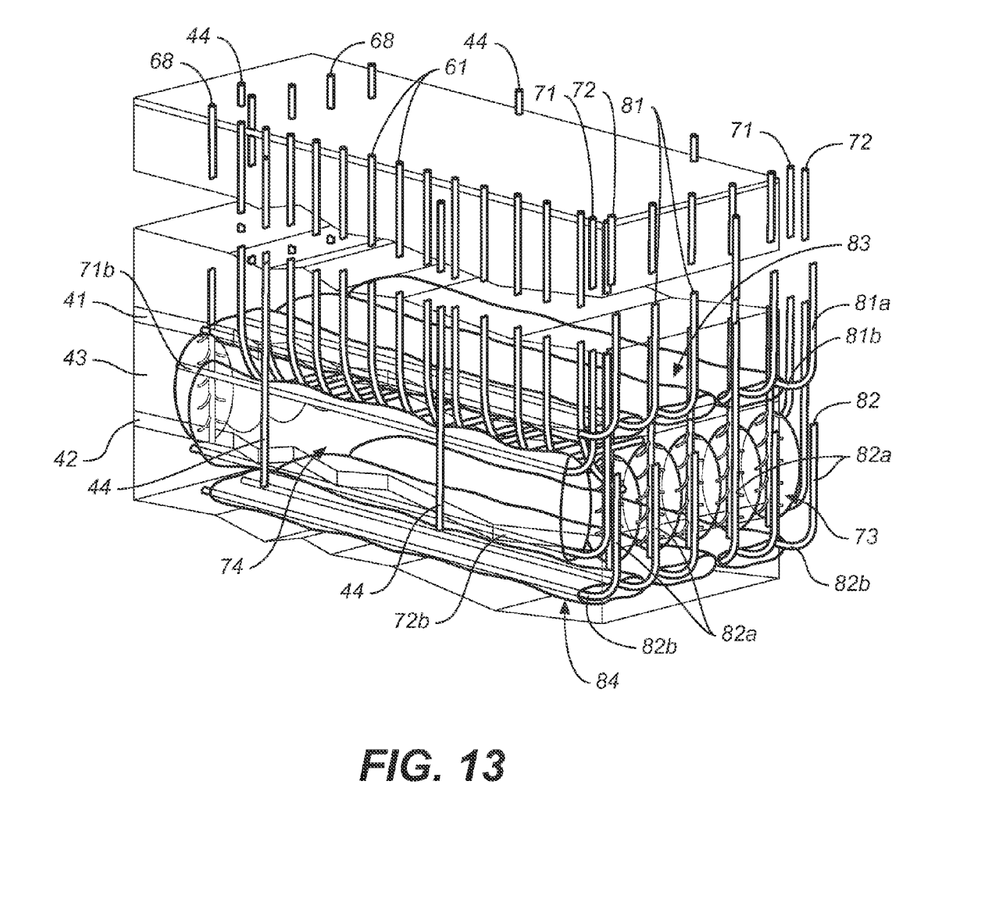

FIG. 12 illustrates an embodiment similar to the embodiment of FIG. 7, with the addition of containment barriers around the lateral periphery of the storage zone. In this embodiment, with the two sets of horizontal wells 61b, 61c extending in opposite directions for the injection/production wells, the storage zone is wider, and the rows of vertical barrier wells 68 at the ends of the containment extend to the outer ends of the wells in both sets. Barrier wells 71, 72 on the two sides of the containment are likewise located farther apart to accommodate the second set of horizontal wells. Here again, the barrier material or sealant 76, 77 injected into the barrier wells overlaps to form a continuous horizontal containment barrier for the storage zone.

The invention has a number of important features and advantages. For the first time, underground reservoirs can be built and used where they are needed, rather than where they happen occur in nature. The invention makes it possible to construct gas or liquids storage reservoirs in many geological settings using conventional drilling and completion techniques. The reservoirs can be engineered to scale and performance specifications, and be located where such reservoirs are required. Further, the barrier technologies in the invention are likely to be applicable to non-reservoir geological problems such as hazardous waste containment.

The system is suitable for use in storing both gases and liquids in a number of applications including daily, monthly and seasonal cycle natural gas storage, CAES and long term sequestration of $CO_2$ and other global warming gases, and it provides a mechanism for managing, monitoring, auditing, and maintaining the storage over a very long period of time.

Barrier walls utilize the natural horizontal compressive forces of the formation in combination with the hydrostatic and lithostatic forces to contain the stored gas or liquid at depths that can be significantly shallower than would be required if only the hydrostatic and lithostatic forces were relied upon.

It is apparent from the foregoing that a new and improved underground storage system and method have been provided. While only certain presently preferred embodiments have been described in detail, as will be apparent to those familiar with the art, certain changes and modifications can be made without departing from the scope of the invention as defined by the following claims.

The invention claimed is:

1. A method of storing a gas or a liquid in an underground geological formation, comprising the steps of: drilling a plurality of horizontally extending, laterally spaced storage wells into the formation between layers of cap rock, drilling horizontally extending barrier wells into the formation between the storage wells, drilling a plurality of laterals into the formation from each of the storage wells and in each of the barrier wells, injecting a sealing material into the formation through the boreholes and laterals in the barrier zones to form containment barriers between the storage wells, and injecting a compressed gas or liquid into the formation through the storage wells and the laterals extending therefrom.

2. An underground system for storing a gas or a liquid, comprising a plurality of laterally spaced wells having cased vertical sections and uncased horizontal sections extending from the vertical sections into an underground formation between layers of cap rock in a direction perpendicular to the direction of least in-situ principal tectonic stress in the formation, a gas or liquid injected into the formation through the wells and contained vertically in a storage zone by the layers of cap rock, a plurality of barrier wells with horizontal sections extending into the formation above the upper layer of cap rock, and a horizontally extending containment barrier formed by sealant material injected through the barrier wells and into the formation above the upper layer of cap rock.

3. An underground system for storing a gas or a liquid, comprising a plurality of laterally spaced wells having cased vertical sections and uncased horizontal sections extending from the vertical sections into an underground formation between layers of cap rock in a direction perpendicular to the direction of least in-situ principal tectonic stress in the formation, a gas or liquid injected into the formation through the wells and contained vertically in a storage zone by the layers of cap rock, a plurality of barrier wells with horizontal sections extending into the formation beneath the lower layer of cap rock, and a horizontally extending containment barrier formed by sealant material injected through the barrier wells and into the formation below the lower layer of cap rock.

4. A method of storing a gas or a liquid in an underground geological formation, comprising the steps of: drilling a row of vertical wells into the formation, drilling horizontal wells from the vertical wells into the formation between layers of cap rock in a direction perpendicular to the direction of least in-situ principal tectonic stress in the formation, and injecting a compressed gas or liquid into a storage zone in the formation through the wells, with the compressed gas or liquid being contained vertically by the layers of cap rock.

5. The method of claim 4 including the step of monitoring conditions in the formation after the gas or liquid has been injected into the formation.

6. The method of claim 4 including the steps of drilling test wells into the formation for use in selecting the formation, and utilizing the test wells to monitor conditions in the formation after the gas or liquid has been injected.

7. The method of claim 4 including the steps of drilling additional wells into the formation to the sides of the storage zone, and injecting a sealant material into the formation through the additional wells to form a peripheral containment barrier around the storage zone.

8. The method of claim 4 including the steps of drilling a plurality of horizontally extending barrier wells into the formation beneath the lower layer of cap rock.

* * * * *